July 9, 1957  W. M. CARRAWAY ET AL  2,798,330
NIGHT FISHING DEVICE
Filed July 8, 1955 2 Sheets-Sheet 1
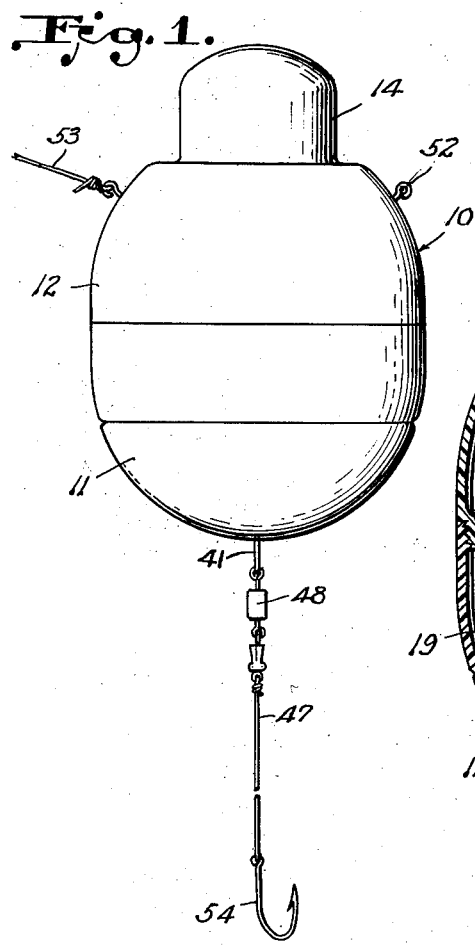
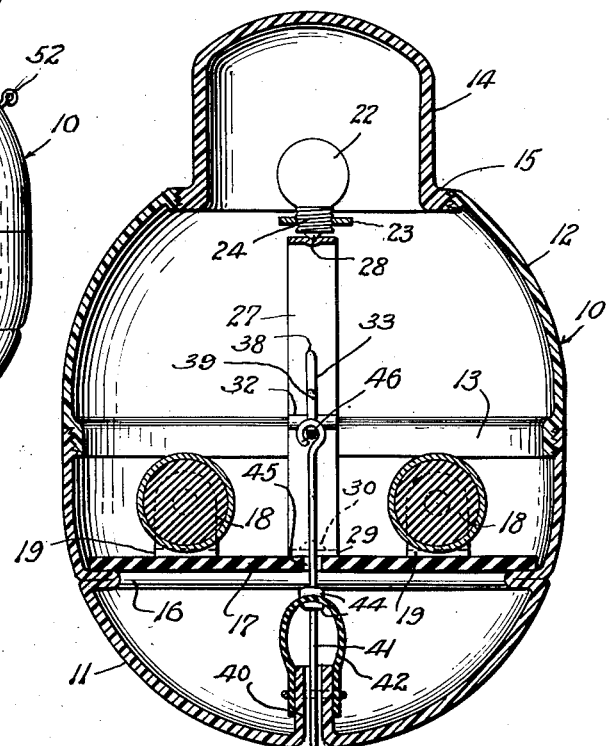
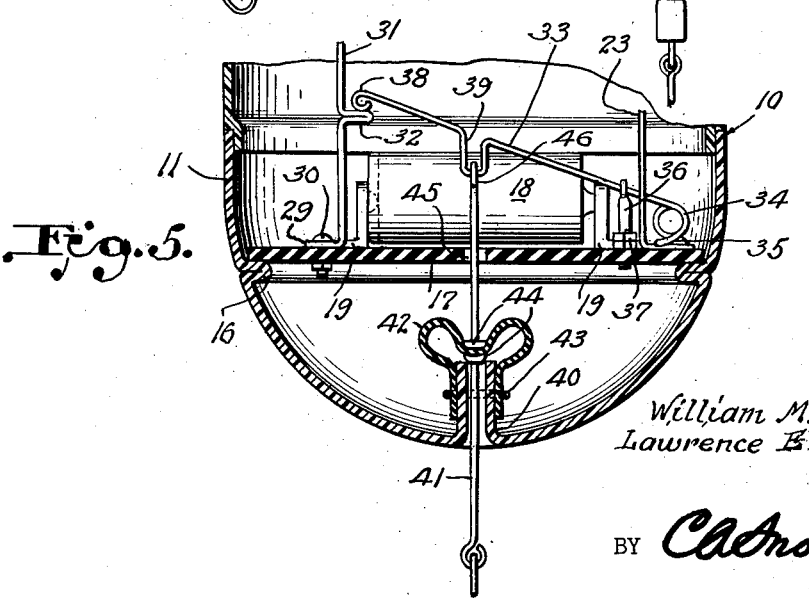
William M. Carraway
Lawrence E. Tedder
INVENTORS.
BY *Cathrow Leo.*
ATTORNEYS.

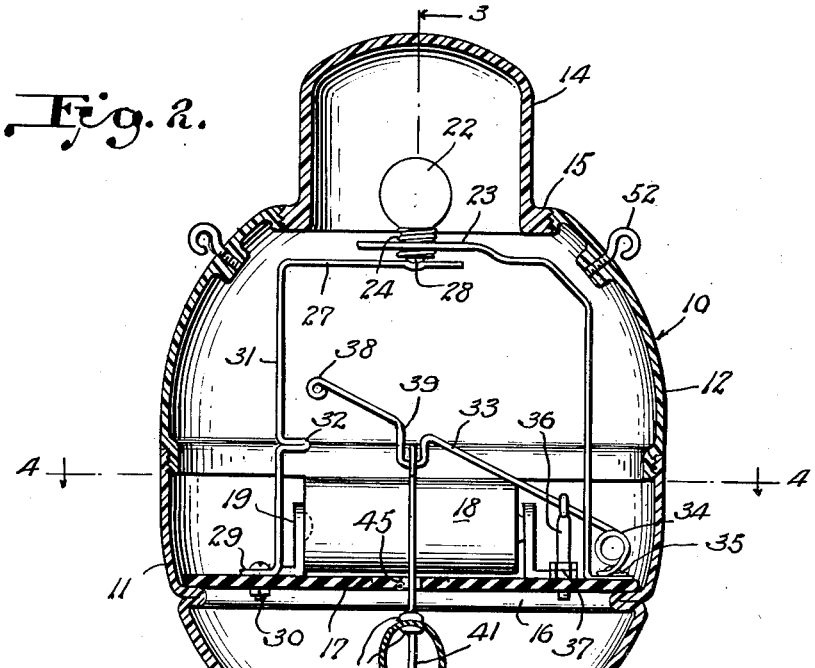
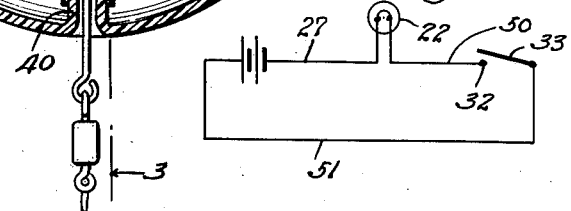
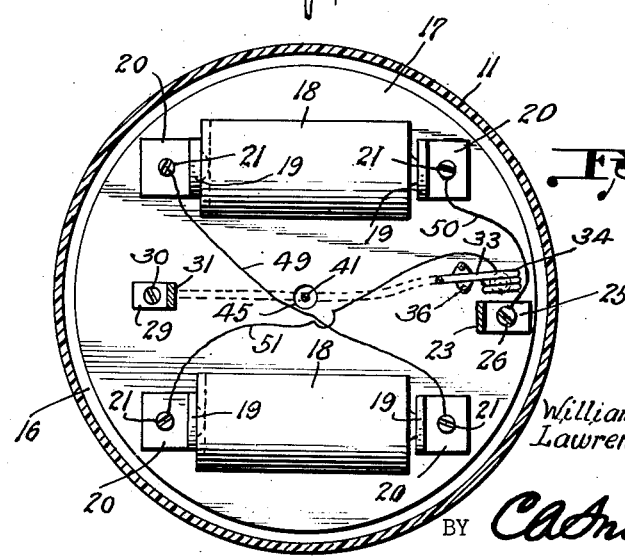

2,798,330

NIGHT FISHING DEVICE

William Marshall Carraway and Lawrence Edward Tedder, Little Rock, Ark.

Application July 8, 1955, Serial No. 520,661

1 Claim. (Cl. 43—17)

This invention relates to a device for facilitating night fishing.

An object of this invention is to provide a device in the form of a buoyant element having a line and hook extending therefrom with means whereby the device will be illuminated when a fish engages the hook.

Another object of this invention is to provide a device of this kind which is simple in construction and will withstand considerable rough handling.

A further object of this invention is to provide a device of this kind which includes a transparent or translucent closed housing with means in the housing for illuminating the housing when a fish grasps the hook and pulls on the line.

With the foregoing and other objects in view which will appear as the description proceeds, the invention consists of certain novel details of construction and combinations of parts, hereinafter more fully described and pointed out in the claims, it being understood that changes may be made in the construction and arrangement of parts without departing from the spirit of the invention as claimed.

Referring to the drawings:

Figure 1 is a side elevation of a night fishing device constructed in accordance with an embodiment of this invention.

Fig. 2 is a vertical section through the device.

Fig. 3 is a vertical section taken on line 3—3 of Fig. 2.

Fig. 4 is a horizontal section taken on line 4—4 of Fig. 2.

Fig. 5 is a fragmentary vertical section similar to Fig. 2 showing the switch in circuit closing position.

Fig. 6 is a diagrammatic view of the electric circuit embodied in this invention.

Referring to the drawings, the numeral 10 designates generally a closed and substantially circular buoyant housing which is formed of plastic material which may be either transparent or translucent. The housing 10 is formed of a lower housing section 11 and an upper housing section 12 having an annular lower flange 13 which is threaded into the upper end of the lower section 11. A transparent or translucent cap 14 having a lower annular flange 15 is threaded into the upper end of the upper section 12.

The lower section 11 is formed interiorly thereof with an annular rib 16 on which a plastic or insulating plate 17 is adapted to be mounted. A pair of battery cells 18 are disposed on the upper side of the plate 17 and are yieldably secured between a pair of L-shaped angle members 19. These angle members 19 include a base 20 secured to the upper side of the plate 17 by means of a bolt 21. Each bolt 21 forms a terminal with which an electric wire, as will be hereinafter described, is connected.

A light bulb 22 is supported within the dome or cap 14 by means of an inverted L-shaped supporting bar 23 which forms a socket through which the base 24 of the bulb 22 is threaded. The L-shaped member 23 is formed with a right-angled base 25 as shown in Fig. 4, secured by a bolt 26 to the upper side of the plate 17. A second inverted L-shaped member 27 engages the center contact 28 of the bulb 22 and the L-shaped member 27 is formed with a base 29 secured by means of a bolt 30 to the upper side of the plate 17. The L-shaped member 27 is formed intermediate the vertical side 31 thereof with an inwardly projecting contact 32 forming one side of a switch. A resilient switch arm 33 having a coiled outer end 34 is secured by fastening means 35 to the upper side of the plate 17. A saddle or arm tensioning member 36 is threaded at its lower end into the insulating plate 17 and locked in adjusted position by means of lock nuts 37.

The switch arm 33 extends through the upper end of the saddle 36 and the free or upper end of arm 33 is formed with a contact 38 adapted when in circuit closing position to engage the contact 32. The switch arm 33 at a point intermediate the ends thereof and substantially co-axial of the housing 10, is formed with a U-shaped or downwardly bent portion 39.

On the lower housing section 11 of the axial center of the housing 10 is formed an upwardly or inwardly projecting nipple 40 through which a rod 41 loosely passes. A cap or resilient diaphragm member 42 is secured to the nipple 40 by means of a lock rim 43. The rod 41 projects through the diaphragm or cap 42 and is secured relative to the diaphragm or cap 42 by fastening members 44. The plate 17 in the center thereof is formed with an opening 45 through which the rod 41 extends, and the upper end of the rod 41 is formed with an eye 46 engaging the bight of the U-shaped member 39. The leader 47 of the fishing line is connected to the lower projecting end of rod 41 by means of a connecting member 48 which may be in the form of a weight or sinker, whereby the housing 10 may be maintained in an upright position when disposed in the water.

The batteries 18 are connected in series with one negative pole of one battery being connected to the positive pole of the other battery by means of a conductor 49 as shown in Fig. 4. The positive pole of one battery is connected by means of a conductor 50 to the base member 25 of L-shaped socket forming member 23 and the negative terminal of the other battery is connected by means of a conductor 51 to fastening member 35.

In order to provide means whereby the housing 10 may be anchored or otherwise maintained captive, the upper housing section 12 has secured thereto one or more eye screws 52 with which a line 53 is adapted to be connected.

In the use and operation of this device the leader 47 having a fish hook 54 on which a suitable bait is mounted, the housing 10 is disposed in a body of water and is held against relative movement by means of the line 53. The switch formed by the two contacts 32 and 38, is normally open so that the light bulb 22 will normally be unlighted. When a fish grabs the bait on hook 54 and pulls on the hook and leader, diaphragm 42 will collapse downwardly as shown in Fig. 5, thereby swinging switch arm 33 downwardly to a circuit closing position. At this time the light bulb 22 will be energized so that the housing 10 will be illuminated. The post or saddle member 36 will provide the desired tensioning of the resilient switch arm 33 so that the switch will not be closed until a fish has actually grasped the hook and is pulling on the leader 47 and line 53.

What is claimed is:

A night fishing device comprising a hollow buoyant body formed of separable upper and lower body members, an illuminable dome carried by said upper member, an annular inwardly projecting flange in said lower member, an insulating wall seated on said flange, a light bulb supporting means carried by said wall, a light bulb on said supporting means interposed in an electric circuit, a switch contact carried by said supporting means, a spring-pressed switch arm normally disengaged from said contact, an upwardly projecting nipple carried by said lower body member, a resilient upwardly bulging diaphragm carried by said nipple, a switch operating rod fixed at an intermediate point to said diaphragm and means securing the upper inner end of said rod to said switch arm whereby the rod biases the switch arm toward an open circuit position, a fishing line secured to the lower extended end of said rod, said circuit including an electric power source carried by said wall.

References Cited in the file of this patent

UNITED STATES PATENTS

| | | |
|---|---|---|
| 989,145 | Hatchett | Apr. 11, 1911 |
| 2,476,633 | Sohr | July 19, 1949 |
| 2,608,784 | Lando | Sept. 2, 1952 |

FOREIGN PATENTS

| | | |
|---|---|---|
| 463,794 | Canada | Mar. 21, 1950 |